United States Patent [19]
Cohen et al.

[11] Patent Number: 5,737,595
[45] Date of Patent: Apr. 7, 1998

[54] DISTRIBUTED DATABASE SYSTEM AND DATABASE RECEIVER THEREFOR

[75] Inventors: Thomas Andrew Cohen, Cottesloe; Robert Jeffries Chatfield, Leederville, both of Australia

[73] Assignee: Io Research Pty. Limited, West Perth, Australia

[21] Appl. No.: 436,336

[22] PCT Filed: Nov. 26, 1993

[86] PCT No.: PCT/AU93/00604

§ 371 Date: Jul. 18, 1995

§ 102(e) Date: Jul. 18, 1995

[87] PCT Pub. No.: WO94/13102

PCT Pub. Date: Jun. 9, 1994

[30] Foreign Application Priority Data

| Nov. 24, 1992 | [AU] | Australia | PL 6080 |
| Aug. 13, 1993 | [AU] | Australia | PM 0549 |
| Aug. 20, 1993 | [AU] | Australia | PM 0742 |
| Sep. 30, 1993 | [AU] | Australia | PM 1570 |
| Sep. 30, 1993 | [AU] | Australia | PM 1571 |
| Oct. 1, 1993 | [AU] | Australia | PM 1621 |

[51] Int. Cl.$^6$ .................................................. G06F 17/30
[52] U.S. Cl. ................................................ 395/611; 395/615
[58] Field of Search ............................. 395/611, 612, 613, 614, 615, 616, 617, 618, 619, 620, 200.01, 200.02, 200.03, 200.04, 200.05, 200.06, 200.07, 200.08, 200.09, 200.12, 200.13, 200.14, 200.15, 200.16, 200.17, 200.18, 200.19, 800

[56] References Cited

U.S. PATENT DOCUMENTS

| 5,019,963 | 5/1991 | Anderson et al. | 395/617 |
| 5,560,038 | 9/1996 | Haddock | 395/800 |
| 5,604,867 | 2/1997 | Harwood | 395/200.13 |

FOREIGN PATENT DOCUMENTS

| 0379252 | 7/1990 | European Pat. Off. |
| 0477786 | 4/1992 | European Pat. Off. |
| 0491068 | 6/1992 | European Pat. Off. |
| 0513925 | 11/1992 | European Pat. Off. |
| 0556701 | 8/1993 | European Pat. Off. |
| 1-296881 | 11/1989 | Japan |
| 1-316080 | 12/1989 | Japan |
| 2 223 150 | 3/1990 | United Kingdom |
| 2 231 470 | 11/1990 | United Kingdom |
| WO 85/02082 | 5/1985 | WIPO |
| WO 93/09631 | 5/1993 | WIPO |

*Primary Examiner*—Thomas G. Black
*Assistant Examiner*—Ruay Lian Ho
*Attorney, Agent, or Firm*—Woodcock Washburn Kurtz Mackiewicz & Norris LLP

[57] ABSTRACT

A distributed database system includes a central station for accumulating and distributing data on a database, and a plurality of receiver stations that receive the data and selectively make available at least portions of the data in accordance with the demands of a user. A transmitter encodes and transmits the sequential data stream for delivery embedded within television signals.

38 Claims, 12 Drawing Sheets

DISTRIBUTED DATABASE SYSTEM AND DATABASE RECEIVER THEREFOR

TECHNICAL FIELD

This invention relates to a distributed database system and database receiver therefor, which has particular, but not exclusive, applicability to data broadcasting or datacasting communications media.

BACKGROUND ART

The closest system known to the applicant is a system often referred to as "teletext". The teletext system utilises the vertical blanking interval (VBI) of a television transmission for the purposes of broadcasting predetermined blocks of text material. The blocks of text are organised as pages where each page provides one screen of text material. The text format for each page is fixed as are the total number of pages of text material. The pages are broadcast repeatedly consecutively. Noted defects of this kind of system include the rigidity of the text in its page format and also the significant delays that can be encountered whilst a user waits for a requested page to come around to its time for re-transmission.

DISCLOSURE OF INVENTION

It is an object of the present invention to provide a system by which a database can be distributed from a central station with thematically linked data to one or more users at remote locations and where the user can autonomously group the received data for interpretation according to the demands of the user in an efficient and fast manner compared with prior art systems. channel capacities.

Throughout this specification the term "data" is to be interpreted broadly to include all forms of information, whether it is to be output to the user as text, graphics, video, audio and whether the data is for the purposes of presentation to the user or whether the data has a functional purpose or computational purpose eg. forms part of a system header, a system programme component or the like.

Similarly, the term "database" is to be interpreted broadly as a general source and/or repository, however accessible, of data as defined in its broadest form above.

In accordance with one broad aspect of the present invention, there is provided a distributed database system comprising:

central station for accumulating and distributing data on a database, and a plurality of receiver stations for receiving said data and selectively making available at least portions of said data in accordance with the demands of a user of a said receiver station;

wherein said central station comprises: a data store for storing accumulated data from said database for constituting a database, ready for distribution; processing means for extracting said data from said data store and generating a sequential data stream therewith for distribution; and transmission means for encoding and transmitting said sequential data stream; and a said receiver station comprises: decoder means to receive and decode transmitted data so as to reconstitute said data therefrom; input means for a user of said receiver station to input user commands in respect of the demands of the user to said receiver station; receiver processing means for constituting a database from said data having regard to said user commands; memory means for storing data for constituting said database; and means for communicating selected data in direct response to said user commands.

In accordance with another aspect of the present invention, there is provided a database receiver for a distributed database system of the type defined in the preceding aspect of the invention comprising:

decoder means to receive and decode data transmitted to the database receiver to reconstitute database data therefrom;

input means for receiving and processing user commands input by a user of said database receiver in respect of the demands of the user;

receiver processing means for constituting a database from said data having regard to said user commands;

memory means for storing data for constituting said database; and means for communicating selected data from said constituted database in direct response to said user commands.

In accordance with another aspect of the invention, there is provided a method for providing a distributed database for access and searching by a user comprising:

accumulating and distributing data from the database to, a plurality of users;

receiving and analyzing the data in accordance with the demands of the user for selective storage of the data searching the stored data in response to a user command having regard to the demands of the user; and communicating selected stored data conforming to the demands of the user, to the user.

In accordance with a further aspect of the invention, there is provided a method for receiving distributed database data and selectively communicating the same to a user comprising:

receiving and decoding distributed data to reconstitute database data therefrom;

receiving and processing user commands representative of the demands of a user;

constituting a database from the database data having regard to the user commands;

storing selected database data for the constituted database; and communicating selected database data from the constituted database in direct response to the user commands to the user.

In a further broad form of the invention, there is provided a distributed database system comprising a primary database which is in communication via communication means with a plurality of remote subscriber stations; each remote subscriber station including storage means adapted to store at leant a selected portion of said primary database, each said station further including data processing means adapted to process information stored in said storage means.

In a further broad form of the invention there is provided a distributed database system comprising at least a primary database in communication via communication means with a plurality of remote receiver stations; each remote receiver station including storage means adapted to store at least a selected portion of said primary database, each said receiver station further including data processing means adapted to process information stored in said storage means.

In a preferred form said system further includes input means for a user of a maid receiver station and wherein said data praying means processes information contained in data sent from said at leant primary database and also processes information received from said input means in order to determine which portions of said data and in what manner said portions of said data are to be presented to said user by said receiver station.

In a further broad form of the invention there is provided a remote receiver station for use with the distributed database system, maid receiver station further including input means for a user and wherein said date processing means processes the information contained in data received from one or core sources of data and also processed information received from said input means in order to determine which portions of said data and in what manner said portions of said data are to be presented to said user by said receiver station BRIEF DESCRIPTION Of DRAWINGS Embodiments of the invention will now be described with reference to the accompanying drawings wherein:

FIG. 1 in a schematic block diagram of a distributed database system according to a first embodiment of the invention;

FIG. 2 is a schematic block diagram of the hardware comprising the database receiver disposed at a receiver station of FIG. 1;

FIGS. 3a, 3b 3c are flowcharts showing the method of operation of the database receiver of FIG. 2 in accordance with appropriate operating software programed into the receiver processor, where FIG. 3a is a flowchart showing the method of operation of the decoder means;

FIG. 3b is a flowchart showing the method of operation of the receiver processing means; and FIG. 3c is a flowchart showing the method of operation of the input means and the means for communicating selected database data;

FIG. 4 is a block diagram of a further example of the system of FIG. 1 including a modem return link interface to a TV multimedia display processor, FIG. 5 is a flow chart of the operation of the modem return link of FIG. 4, FIG. 6 is a block diagram of a further example of the system of FIG. 1 incorporating a cordless telephone handset, FIG. 7 is a concept diagram for a system according to the invention incorporating a return link and more than one source of input data for the receiver stations.

FIG. 8 is a block system diagram of a detailed implementation of the system of FIG. 7.

FIGS 9A-9G comprise schematic block diagrams of an object oriented packet structure for transmission of data adapted for use in conjunction with any one of the examples of the distributed database system of the invention, and FIG. 10 in an electrical schematic diagram of the receiver of FIG. 8.

DESCRIPTION OF PREFERRED EMBODIMENTS

Figure 1:
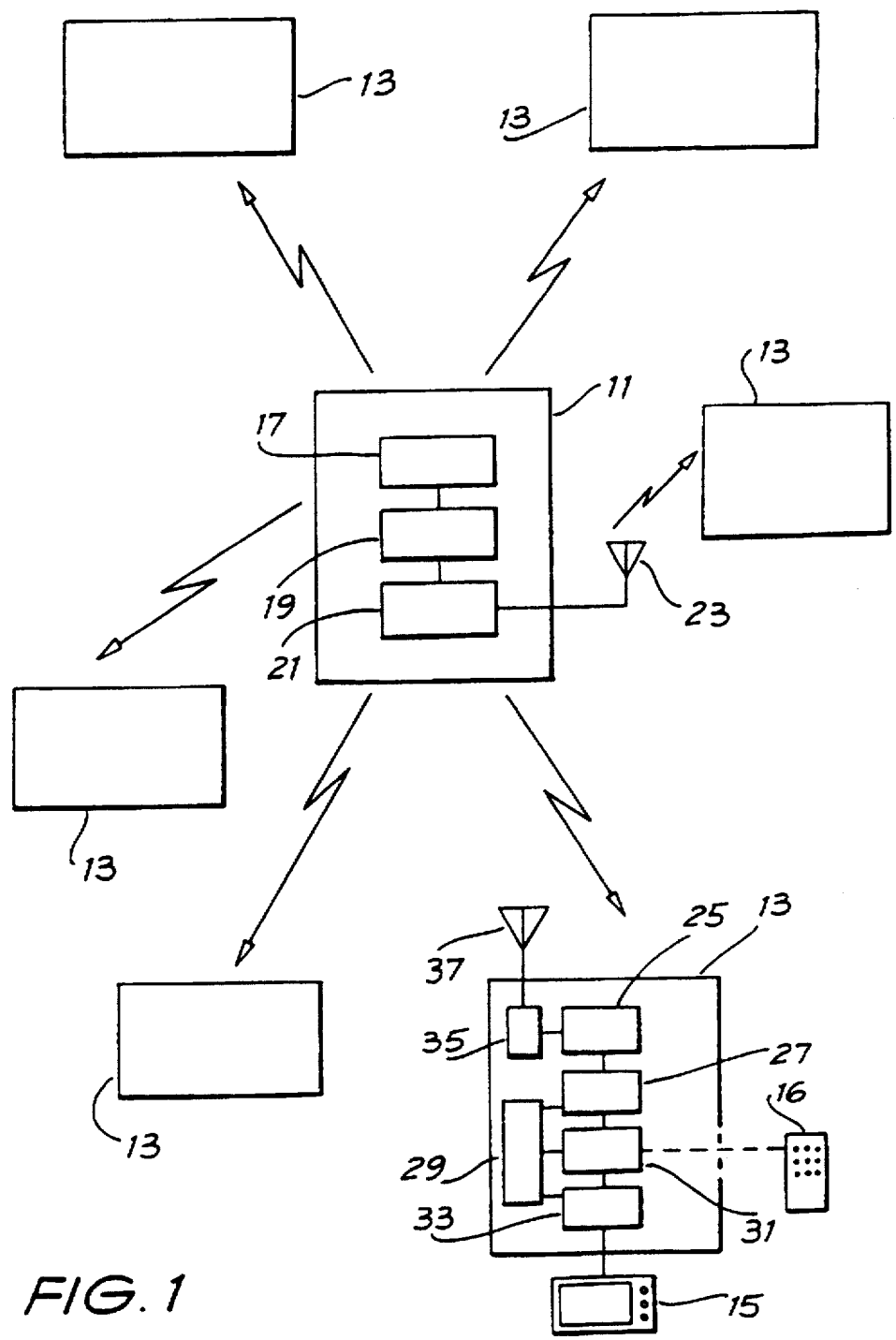

The distributed database system of FIG. 1 is directed towards a distributed database system in the form of a datacast network and includes a plurality of database receivers which form part of the network.

As shown in FIG. 1 of the drawings, the distributed database system 10 comprises a central station 11 for accumulating and distributing data for a database, the central station being for example a television broadcast station, and a plurality of receiver stations 13, which are specially adapted to include a database receiver for receiving the broadcast data from the central station 11 and selectively communicating the data in a database format to a user located at the receiver station in accordance with the demands of the user.

The datacast network utilises television signals to convey digital information for text display at the receiver stations. In this respect, the central station 11 generates a stream of data which is encoded into datacast packets as defined by the World Standard Teletext specification and know as Packet 31 data. This data stream is inserted into the vertical blanking interval (VBI) of the television broadcast signal transmitted from the central station 11 and is subsequently broadcast over the ether to be received by the receiver stations 13 at which are located display screens 15, such as television receiver sets or video monitors on which selected groups of received information can be displayed, and remote user interface devices 16, such as keypad controllers or the like.

The central station 11 for the purposes of datacasting generally comprises a data store in the form of a computer file server 17 which is adapted to accumulate and store data in the form of digital records to form the database.

The file server 17 is connected to a processing means in the form of a data broadcast inserter. The inserter 19 is adapted to extract digital records in the form of database data from the file server 17 and generate a sequential data stream from this database data for distribution to the receiver stations. Importantly, the inserter is adapted to insert this data stream into the VBI of the broadcast television signal. This combined signal is passed on to a transmission means 21 which includes appropriate modulation and transmission circuitry for encoding and transmitting the sequential data stream via an antenna 23 in accordance with conventional broadcasting practice.

In conceptual forms, the database receiver at a receiver station 13 generally comprises decoder means 25, receiver processing means 27, memory means 29, input means 31 and means for communicating selected database data 33.

The decoder means 25 is connected to an input system 35 such as a TV tuner which is connected to a receiving antenna 37 for the purposes of receiving transmitted data broadcast from the central station 11. The decoder means is particularly deplaned to decode the transmitted data ac as to reconstitute the database from the transmitted data.

The receiver processing means 27 is designed to constitute a database from reconstituted database data and store the same within an appropriate memory location of the memory means 29.

The input means 31 is associated with the remote control receiver interface 16 which is provided with a keypad for issuing user commands and database search parameters to the input means 31 when operated by the user. The remote control interface 16 uses an infrared communication link with the input means 31 in accordance with conventional design practice for interfaces of this kind.

The input means 31 is adapted to access and extract selected communicable data stored within the memory means 29 for storage within another location of the memory means 29 in direct response to the user commands.

The means 33 for communicating is designed to simply display the communicable data atoned within the other location of the memory means 29 on the display screen 15, which is directly connected thereto pursuant to the user commands.

An important consideration in this embodiment with respect to the database data which is broadcast from the central station 11 to the receiver stations 13 is that no assumptions are made about the nature of the information that is to be distributed, except that an individual element of the data may have some relationship to other data elements which if perceivable to the user. Consequently, that property of the data may allow it to be dynamically grounded in relationships which are perceived by the user and hence can be acted upon by the issuance of a search command by the user at the receiver station. Importantly, the groupings are not fixed in advance at the central station, but rather are determined by choice and operation of the remote control interface 116 at the receiver station end. Thus, it is at the database receiver end that the database is constituted in response to the user demands, whereby the database receiver is adapted to receive, maintain, store and calculate the relationships between database data broadcast to it from the central station.

Each logical element of information which is broadcast is called a data entry and may consist of any number of characters. These characters are delivered by the user data portion of a datacast packet as defined by the World Standard Teletext specification.

Figure 2:
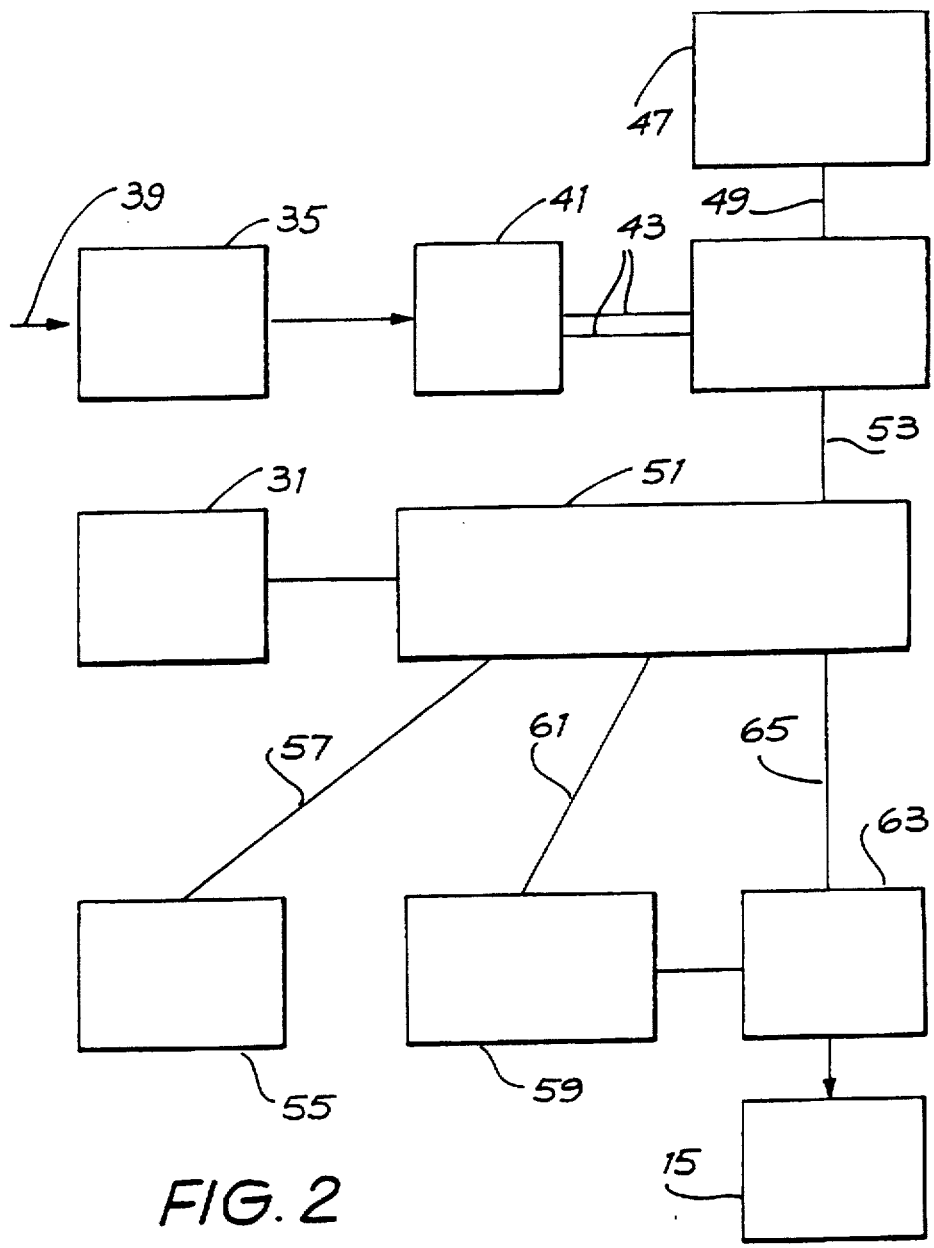

Now more particularly describing the components of the database receiver, reference is made to FIG. 2 of the drawings.

As shown, the transmitted data signal as represented by the arrow 39 is received by the antenna 37 and applied to the input system 35 from which the video signal carrying the database data in passed to a data acquisition means in the form of a video input processor 41 forming part of the decoder means 25. The video input processor 41 is of conventional design for extracting a serial data stream from the video signal, as defined in the World Standard Teletext specification, and to reconstruct a Teletext clock which is as a synchronizing signal used for further processing of the serial data stream. The serial data stream and Teletext clock signals are passed via appropriate bus lines 43 to a "packet 31" data broadcast decoder 45 which also forms part of the decoder means 25. The packet decoder 45 in again of conventional design to conform to the World Standard Teletext specification and is adapted to accept the data stream and Teletext clack signals and perform a low level translation of the aerial data stream into byte wide data which in turn is passed into a buffer comprising a first in first out (FIFO) memory 47 via a high speed bidirectional data bus 49.

The packet decoder 45 is constructed from a variety of embedded processor using very large-scale integrated (VLSI) circuits, gate arrays and other processor technologies.

The FIFO memory 47 is required to provide a continuous output data stream of database data from the sporadic input data stream which comprises bursts of packets of data decoded from the VBI of the transmitted data signal. The packets of data consist of characters that represent database data and other special data broadcasting information. The special data broadcasting information includes framing codes, data channel groups and cyclic redundancy checksums. Accordingly, it in only the database data which is used for the purposes of constituting the database and welsh is further processed by the database receiver, the other special data broadcast information being provided to enable correct processing of the database data in accordance with standard data communications.

A central processing unit 51 is connected to the packet decoder 45 via a high bandwidth bus. The CPU 51 provides the principle computing element of the database receiver and thus forms part of the decoder means 25, receiver processing means 27, input means 31 and the means 33 for communicating.

The CPU 51 interacts with the memory means 29 as part of its operations as the receiver processing means 27, input means 31 and the means 33 for communicating. The memory means 29 is divided into two memories, one being a large database memory 55 which is connected to the CPU 51 via a high speed bus 57 and the other is a communication memory So which is also connected to the CPU 51 by a discrete high speed bus 61.

Operation of the CPU 51 fores part of the decoder means 25 by including the construction of a data stream which is restricted to reconstituting database data only. The CPU 51 continuously reads database data from the FIFO memory 47 when data is available in the FIFO and makes that data available for further processing by the receiver processing means 27 by transfer means.

The database data which is processed by the CPU 51 in its operation as the receiver processing means 27 is actually divided into displayable records of the constituted database and index data relating these records. The database memory 55 is used to store a prescribed number of the displayable records and the associated index data thereof in a separate table which is used for searching and retrieving the displayable records.

In its operation as the receiver processing means 27, the CPU 51 includes a number of software programmes which perform discrete processes in respect of the stream of reconstituted database data received from the transfer means. Moreover, the receiver processing means includes further decoder means to examine the stream of reconstituted database data and to extract index data therefrom, and database handling means to determine the storage of individual database data in accordance with the prescribed algorithm. This algorithm generally involves the database handling means to store individual data entries of database data at a requisite storage location in the database memory 55 so as to constitute a database and to perform prescribed contingency action involving changing the structure of the database continuously in response to new incoming database data having regard to the user demands. The operation of the receiver processing means 27 will be described in mare detail later.

In its operation an part of the input means 31, the CPU 51 provides the processing for the input means 31 in relation to the searching and retrieving of the displayable records stored within the database memory 55 by the receiver processing means 27. These processing functions are performed in accordance with a software programme and will be described later.

The input moans 31 includes appropriate interface decoding circuitry (not shown) for receiving user commands signals input thereto by the remote control interface 16, which is connected to the CPU 51 for direct processing in accordance with the aforementioned software programme.

The means 33 for communicating selected database data of the database constituted by the receiver processing means 27 includes a character generating means 63 to generate characters for displaying on the display screen 15 in deepest of the displayable record stored in the communication memory 59. Accordingly, the communication memory 59 stores selected displayable data records retrieved from the database memory 55 in accordance with the user commands input by the user under the operation of the input means 31. This memory mirrors the information which in displayed on the display screen 15, whereby the data stored therein under operation of the CPU 51 in read by the character generating means 63 in accordance with the control signals input thereto via bus line 65 from the CPU 51. The character generating means 63 is of conventional design being used to produce the actual character display signals for the display screen 15.

As indicated above the operation of the database receiver is determined by the software programmed into the CPU 51 which now will be described generally with reference to the flowcharts shown in FIG. 3 of the drawings.

The operation of the database receiver is divided into three main areas. The first of theme is to operate the decoder means 256 to receive and process information broadcast to it from the central station 11. The second of these is to the receiver processing means 27 to control the storage of this information to constitute a database within the database receiver. The third of these is to operate the input means 31 to enable the extraction of information from this database for the purposes of communication by means of visual display in accordance with the direct demands of the user and to operate the means 33 for communicating the selected records from the database. These three main functional areas all operate concurrently and continuously with each other to provide for optimum efficiency and speed from the user viewpoint.

Figure 3A:
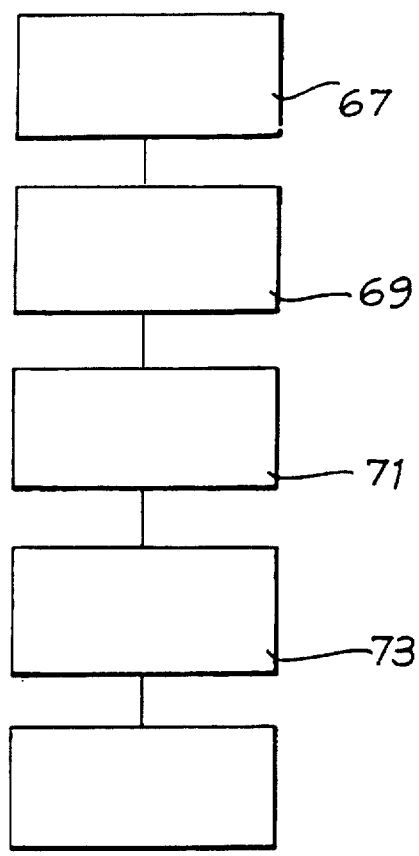

With respect to the fleet area, reference is made to FIG. 3a of the drawings which shown the order in which the data reception functions occur.

When processing is commenced several memories need to be initialised and data paths set up to allow the reception of data. Accordingly, as represented at block 67, the software initializes the FIFO memory 47, the parameters of the database memory 55 and communication or screen memory 59 and the video extraction circuits of the video input processor 41.

Once the memories are set up, an embedded loop for the acquisition of data is entered as represented by block 69 for receiving the "packet 31" packets of data from the video input processor 41. This loop also recombines the "packet 31" data as represented by block 71 into a stream of database data from which the special data broadcast information in filtered out for processing by the receiver processing means 27. This stream of database data is then passed onto the second area of operation, as represented by block 73.

Figure 3B:
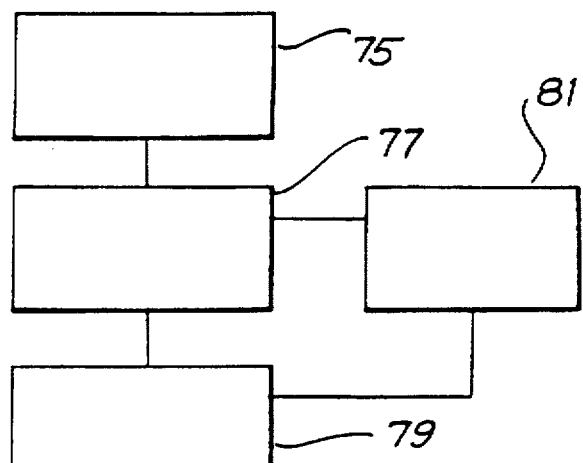

With respect to the second area, reference is made to FIG. 3b of the drawings which shows the order in which the further decoding and data handling functions occur. The receiver processing means 27 receives the serial database data resulting from the data reception process and procreates this data to constitute the database. Moreover, the resultant stream of database data is examined no that the displayable records and the index data are separately extracted as represented at block 75.

The storage of extracted individual database data is then determined in accordance with the prescribed algorithm since the database memory, although large, is limited in size and hence cannot store every displayable record which is broadcast and received by the database receiver. Thus, the algorithm is required to calculate which records that have already been stored within the database memory 55 can be deleted and overwritten by new database data. The main parameter of the algorithm for determining the replacement of database data is the particular thematic link of the displayable record of the database data entry to a met of database search parameter which have been input with the user commands by a user using the remote control interface 16.

As represented by block 77, the algorithm proceeds with the database handling means determining whether there is any free apace available in the database memory 55 for storing displayable records and the index data thereof. If space is available, then the individually extracted displayable records and index data therefor from the incoming database data entry stream is stored in the database memory as represented at block 79. If the database memory 55 is full, then the database handling means refers to the search parameters which correspond to the current input user commands, if they exist, as represented by block 81. If the incoming record is deemed to be relevant in the light of the search parameters, then the database handling means calculates which records may be deleted and overwritten by the incoming record and replace the old record with the new record.

With any new database data which is to be stored, as represented at 79, the displayable record extracted from the data to transferred to the database memory 55 and stored at a prescribed memory location. Concurrently with this, the extracted index data associated with the displayable record in entered into an index table which is also stored within the database memory 55.

The database index table is most important as it contains indexes to all of the displayable records as they exist within the database memory at any particular instant of time. Consequently the database index table is changed and updated simultaneously with the changing and updating of displayable records so that the existing displayable records within the database memory can be searched directly in response to user commands.

Following the storage of displayable records and index data within the database memory, the receiver processing means return to examining incoming database data as represented at 75.

A user can make a request for the communication of some of the information contained within the database at any time. Thus the third area or process is designed to respond to these user commands by searching the database in accordance with the search parameters input with the user commands and extracting displayable records which fall within the scope of the search parameters for viewing by user.

Figure 3C:
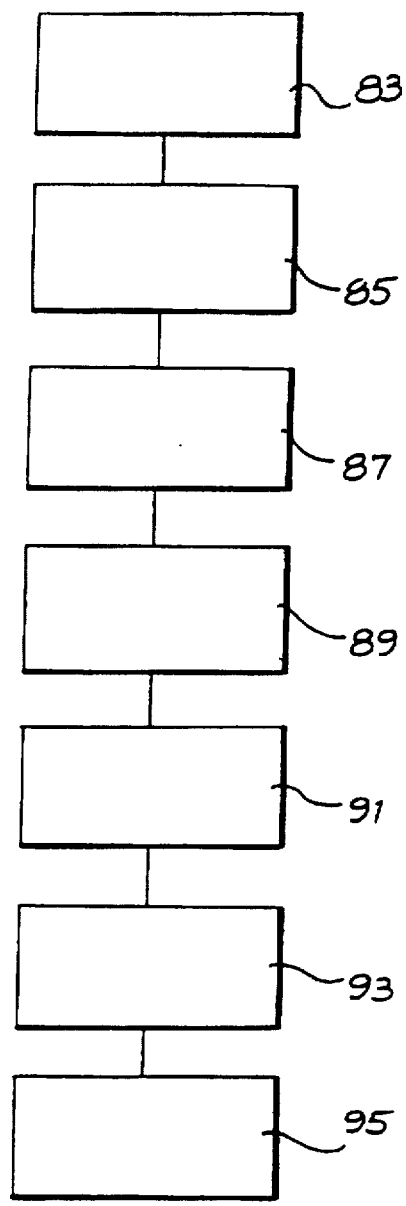

As shown in FIG. 3c of the drawings, the process as performed by the input means firstly involves monitoring any user commands which are input to the database receiver as represented at block 83. In thin respect, a user has a choice of displaying records stored within the database memory 55 which fall within a set of search parameters defined by the user commands. Accordingly when the appropriate user command is received via the interface decoding circuitry of the input means 31, the search parameters are updated or established as represented at 85 and the database memory 55 parsed for displayable records which fall within the established search parameters, as represented at 87. Whenever a displayable record is found that falls within the search parameters. The displayable record in formatted and passed to the communication memory 59 which is represented by block 89. As previously described, the communication memory 59 is used to generate the user display and it in only displayable records which are stored within the communication memory 59 that are actually displayed.

The communication process is performed by the means 33 for communicating database records and initially involved formatting the communication memory 59 according to a prescribed communication or display format according to user commands as is appropriate as represented at block 93 and then communicating the result using the character generating means 63 on the display screen 15 as represented at block 95.

It is possible that more displayable records exist that match the search parameters, since the database is continuously being updated with database data broadcast from the central station 11. In order to accommodate this situation, particularly as only a portion of the total database data is actually capable of being stored within the database memory 55, and that further time is required in order for the constitution of the database to be focused on the particular search parameters to store broadcast database data which previously was deemed not to me relevant facility is made for the user to input user commands which allow scrolling up or down through the displayed list of records. Consequently, as more records are located from the dynamic database which match the search parameters these are passed to the communication memory 59 to be added onto the end of the list records to be displayed or which are being displayed and subsequently are displayed at the appropriate time to synchronise with scrolling by the user. This step is represented by block 97 where additional displayable records are added and subsequently displayed.

With respect to the formatting of the displayed records as represented at block 91, this formatting is performed according to a prescribed format which is pre-stored in the database receiver. Thin communication format is definable separately by appropriate control data broadcast from the central station 11 whenever considered appropriate. Importantly, it does not accompany each database data entry, hence maximizing the volume of database data which in broadcast and hence greatly improving the efficiency of the system.

It should be appreciated that the present invention described with respect to the first embodiment has many advantages over previous distributed database systems such as Videotex and Teletext. Moreover, the particular concept of using a data record as the basic logic unit rather than a fully formatted page, as is the cane with Teletext, provides for more records to be transmitted more quickly. This is especially useful if the records are small such as in small advertisements.

Furthermore, the particular method of processing the received information and determining storage before displaying the same and the methodology of searching and displaying selected records instead of complete pages, overcomes the many limitations of Teletext. Accordingly, in the present system, the majority of data which is transmitted are actual displayable records, whereas this is not the cane in Teletext. Moreover in Teletext, the pages for eventual display are pre-formatted at the central station and therefore are transmitted as complete pages with display information, formatting characters and display colours. Thus, normally a large amount of empty space must be transmitted in every page that is transmitted making the Teletext method of broadcasting extremely inefficient.

Consequently, by using the present invention, a database structure is built up within the database receiver which can be perceived by a user to have many levels. Thus a user may generate a new level by inputting a search request command and the search parameters for the search request. Conversely, a user can retrace past searches by recalling previous levels, since the database data relied upon in still stored within the database memory. Thus a hierarchy of a theoretically unlimited extent of information can be built up.

Another feature of the present embodiment is that every "packet 31" decoder 45 has a subscriber address which is defined in the World Standard Teletext specification. This address comprises a unique number which is contained within circuits associated with the microprocessor thereof. The existence of these numbers means that the central station may address a particular user or set of users at receiver stations 13 and restrict information flow as required. Therefore a means is provided by which the central station can control the destination of information and thereby allow for subscription collection schemes to be set up to facilitate the commercial implementation of the system.

In one example of such an implementation, initially two data streams will be broadcast from the central station. One stream contains subscription data where access is only available after payment of a prescribed subscription fee and enabling of the database receiver, and the other stream is free to air. In other words there is a free component and a subscription component thereby providing two tiers of access.

Once the decoder is turned on, (and the appropriate channel selected on the TV) the database receiver displays the initial menu on the display screen of the TV or displays a flashing icon which shown that data has been received and is available for processing or display. Each menu item has a two digit code number (ie. there can be up to 100 categories: 00–99 in total). For example category 00 may be classified advertising on the free or basic tier, category 01 may be a "Yellow Pages" type services directory and category 02 may be the newspaper. Categories 03– may be the remainder of the free services. Categories –99 lit all 100 categories are used) may be the subscription services and are not accessible to a nonsubscriber. These categories appear on the screen and are designated in some manner as a subscription service, ie. there will be a block denying access to those categories to a free service user only. This initial menu is be transmitted with the data and may change from time to time as categories are added or deleted.

Once a user has made the initial selection by keying in the appropriate two digit code as a user command on the remote control interface, a second menu will appear, offering sub-categories of the initial choice. Again each sub-category is designated by a two digit code. At the level of sub-categories, all choices are available, in there being no distinction between free and subscription services. By way of example within category 00, ie. classified advertising, the first sub-category menu wild offer the range of classifications, e.g. for sale, real estate (for sale and rental), motor vehicles and employment. Each first level sub-category will be presented in blacks determined by the size of the database e.g. real estate A-C, or sale T-Z. Further differentiation into location, product, etc., will occur at the level Of the next sub-category menu. Similarly the first level sub-category menu for category 02 (newspaper) will offer the various sections of a newspaper e.g., port, finance (international and domestic), world news, politics (State and Federal), etc. Subsequent sub-category menus will effectively allow scanning of the newspaper by e.g. company name, politician, country, football code, etc. Sub-category menus will be transmitted with the data in the name manner as the initial menu, allowing the available options to be altered an required to perform to a changing database.

At the level of all sub-categories, there is a maximum of 98 choices available (01–98). In addition to the sub-category choices (all levels), two digit codes (00 and 99) are reserved for exit comments. One enables the user to return to the opening menu, the other to initiate processing without the inputting of any further sub-category information. The exit commands appear as separate keys on the remote controller interface marked "exit" and "process" respectively. The exit command in able to be used to leave a display page and return to the initial menu. Consequently the sub-category semi screen displays up to 98 choices plus prompts for the user of the two screen exit keys. The remote control interface also hen "page up" and "page down" (or "next" and "previous") keys to allow scrolling through large classifications.

Once the "process" key has been used (automatically when there are not further sub-category menus available on the pathway selected by the user) the database receiver generates a display of all the information meeting the criteria determined by the category/sub-category selection process, depending on the nature of the information provided. In some instances there will be no sub-categories at all whilst in others there may be up to four.

By adopting the present technique of storing database data within the database memory, processing time is kept to an absolute minimum before the first screen of selected information is available to the user.

It should be appreciated that the present embodiment provide for the expansion of the services available as described in the above example in terms of the size of the database. In this respect the database receiver is capable of looking for data on any of the channels within the RF range of the television user. Thus the database receiver in designed to have the ability to draw information from a number of carrier VBIs or from a full field data broadcast With reference to FIG. 4, a further example of the distributed database system of FIG. 1 is provided which incorporated a return link.

In the context of TV multimedia which receives forward directional information from a high bandwidth broadcast (point to multipoint) channel carrying RDS, TV packet 31 or their digital domain equivalents (MPEG, MPEG2 and Orthogonal frequency division multiplex broadcast data packets), for interactivity a point to point return link is needed. This return link communication can be of comparatively low speed.

A return link based upon a low speed frequency or phase shift keyed signal which uses standard signalling but is capable of only unidirectional operation may be constructed with relatively few parts.

Figure 4:
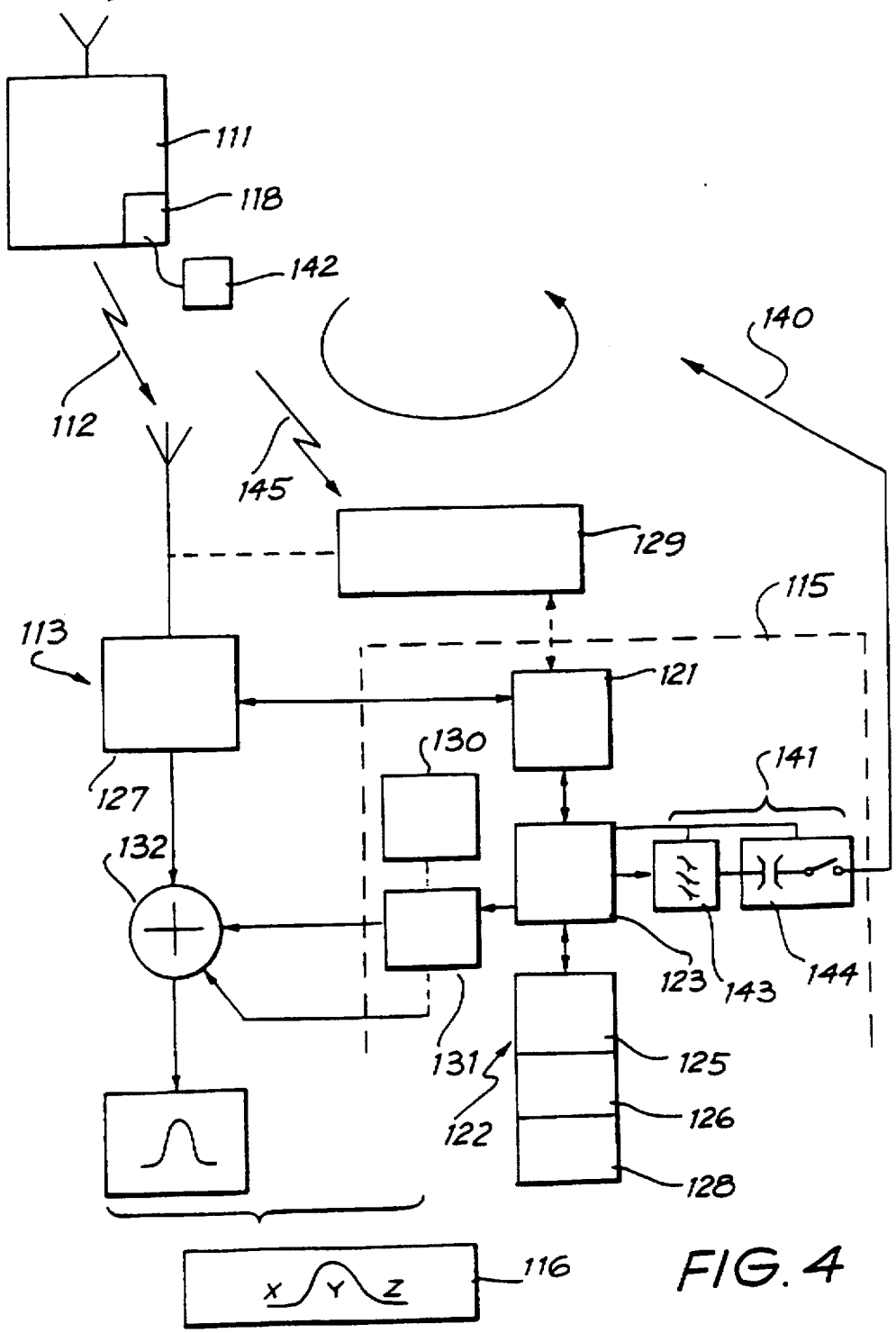

With reference to FIG. 4 a multimedia TV apparatus 110 comprised a TV station 111 in forward communication with a multimedia TV set 113 by way of TV signal 112.

TV signal 112 is communicated via aerial 114 to a tuner 127 of a multimedia TV set which is adapted to be tuned to a TV signal of a particular television channel and to deliver video and audio information derived from that channel. The multimedia TV apparatus 110 additionally includes a multimedia microprocessor 123 which is adapted to derive data delivered via TV signal 112 from database 118 and to instruct the generation of a database visual information signal 117 based on that data for display on display 116.

In thin example, the display processor 115 comprises a microprocessor 123 in communication with a data acquisition device 121, a display generator and display memory 131, 130 respectively and a data storage device 122. T.V. tuner 127 receives a TV signal 112 and derives primary data from a particular channel for display on display 116. The tuner also makes available to data acquisition device 121 from signal 112 information containing secondary data. The data acquisition device 121 derives the secondary data in conjunction with and under control of microprocessor 123 for display via display generator 131 on display 116 either over the top of or in conjunction with or instead of the visual information relating to the primary data. In addition microprocessor 123 can initiate the transmission of data from multimedia display processor 115 back to data base 118 of TV station 111 via an interface 141 adapted for connection to return link 140.

The data from database 118 can be encoded according to packet 131 protocol in the vertical blanking interval of TV signal 112. Other forms of permissible encoding for the data have been described previously. As will be appreciated TV Signal 112 is representative of a one way forward link between TV station 111 (including database 118) and a multiplicity of multimedia TV nets 113.

A return link 140 according to this example is also illustrated in FIG. 4 and comprises a unidirectional link to database 118 in TV station 111 from multimedia microprocessor 123.

Return link 140 can be implemented via the public switched telephone network (PSTN), cellular or GSM telephone networks.

In this particular example as will now be described the return link 140 is implemented via the public switched telephone network operating between microprocessor interface 141 and database interface 142.

With particular reference to FIG. 4 the display processor interface 141 comprises a filter 143 adapted to shape and band limit encoded data signals generated by a microprocessor 123 (for example from the communication ports of an Intel 8051 microprocessor) and to pass the shaped and band limited signal to a line interface circuit 144 for connection to the PSTN.

Interface circuit 144 can comprise a line isolation transformer or an optoisolator and a relay for line connection.

In order to initiate transmission of data from multimedia display processor 118 to database 118 the microprocessor 123 connects the interface circuit 144 to the PSTN by activating the relay and then sends data by signalling. An the microprocessor 123 will not have an acknowledgement via return link 140 that the data has been received its software waits for an acknowledgement to be received embedded in the incoming broadcast system signals. The software operations of microprocessor 123 relevant to return data transmission are listed in FIG. 5.

Figure 5:
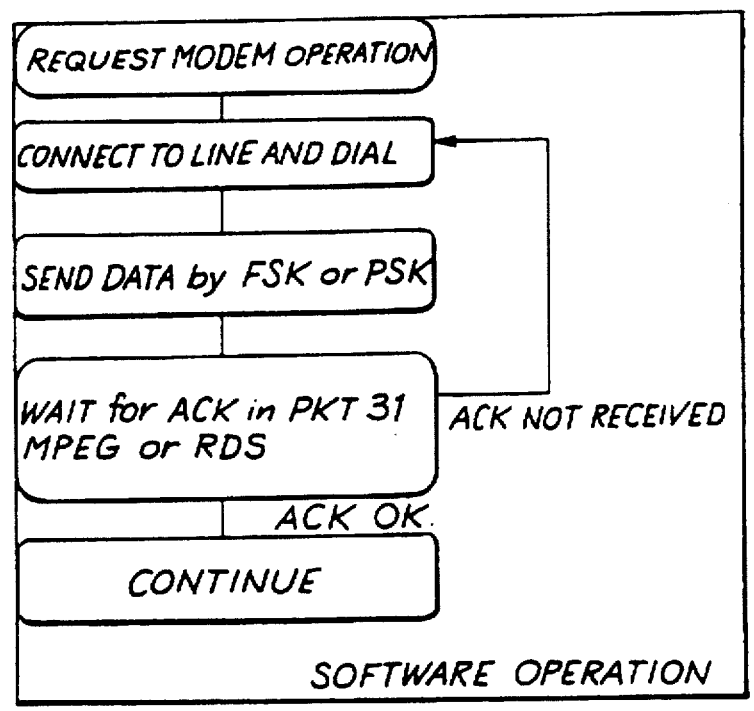

It will be noted in FIG. 5 that if no acknowledgement is received to the data sent via return signal 140 then a medial and retransmission can be initiated by microprocessor 123 after predetermined periods of time.

With further reference to FIG. 4, a data storage 122 is partitioned into two portions, namely displayable data store 125 and executable data store 126.

The data stored in displayable data store 125 comprises data which, ultimately, will be translated into an image for superposition on display 116.

Executable data store 126 receives data comprising executable program code for execution by data manipulator 123.

In use, when determining the manner in which to display displayable data derived from displayable data store 125, the data manipulator 123 executes code derived from executable data store 126. Accordingly the manner in which displayable data is displayed on display 116 can be altered by amendment of the executable data located in executable data store 126.

Alteration can take place by substitution of new data acquired from database 118 via television signal 112.

In this embodiment the data storage 122 comprises flash memory which is a form of electrically erasable read and write memory. Accordingly data is maintained in a stored condition unless and until a specific substitution operation is performed.

Data manipulator 123 includes means for performing specific substitutions and further includes means for determining the nature of the data 120 received via the data acquisition defiles 121.

In one particular form the means for determining the nature of the database data comprises a control programme which reside in executable data store 126. The control programme interprets object identification header information associated with data objects transmitted in the Vertical Blanking Interval according to Packet 31 Protocol so an to determine the nature of the data contained within the object.

The control programme can then make a decision as to what is to be done with that data including the making of a decision as to where and whether the data is to be stored.

Broadly the data may be of a displayable nature intended for display and which is termed displayable data in this specification. Alternatively the data may be in the nature of executable code which can, for example, be directly executable by the data manipulator CPU 123 or can be executable by the data manipulator CPU after passing through an interpreter (which itself can form part of the control programme) or can comprise look up table data adapted for modification of the behaviour of executable code already resident in executable data store 126.

Functionally the control programme will determine the data to be one of the following types:

a) Displayable data for storage in displayable data atone 125;

b) "Stream" data destined either for direct processing and display on display 116 or for temporary storage in the temporary data portion 128 of displayable data store 125 prior to display on display 116;

c) Subscription control data addressed to the multimedia display processor—the subscription control data modifying the behaviour of the control programme for the subscriber (the data can be in the form of look up table data and s broadly categorized as executable data for storage in executable data store 126). The subscription control data can also, for example include acknowledgement data relevant to communications which have taken place between the multimedia television set 113 and data base 118 by a communications route other than television signal 112.

d) Executable data comprising a programme or programmes for execution by the data manipulator/CPU 123—such programmes might include display presentation programmes and the like, and e) Data which it is determined is not destined for the multimedia display processor 115 and which is either, therefore, ignored or rerouted elsewhere.

The data originates from data base 118 and it is broadcast as discrete objects each of one type. Header information associated with each object is encoded with the object prior to transmission so that the nature and type of the information contained within the object can be determined by the control programme operated by the multimedia display processor 115 following reception by the television set 113.

The TV set 113 of FIG. 4 can optionally include a second tuner 129 which is in communication with data acquisition device 121 and is adapted to receive secondary data from a signal other than TV signal 112. The optional signal 145 can, for example, be a commercial FM radio signal containing secondary data encoded in accordance with the RDS system.

Figure 6:
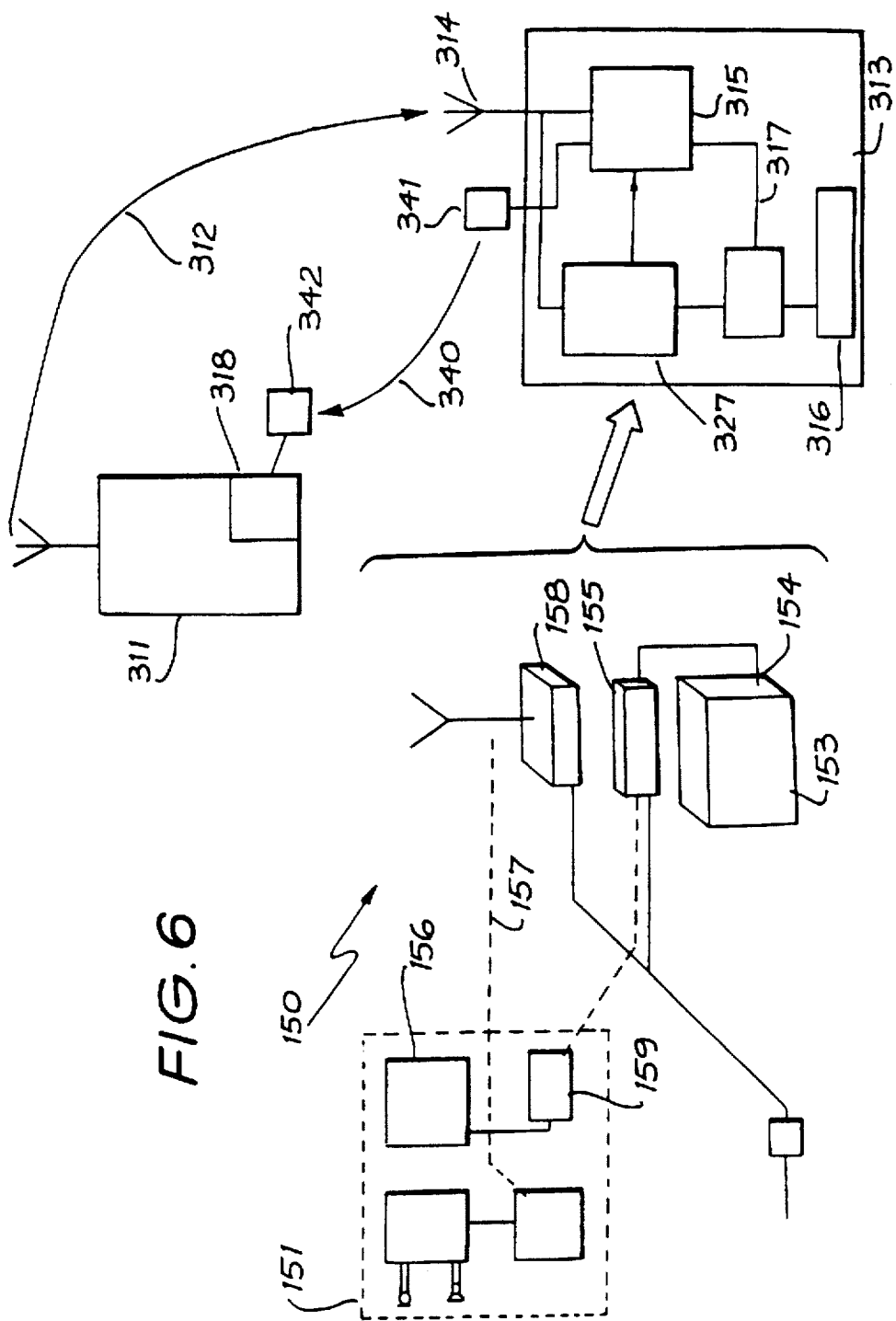

With reference to FIG. 6, a system substantially the same in operation to that described in respect of FIG. 4 will be described in detail.

Like components are numbered as for FIG. 4.

The system of FIG. 6 additionally includes a cordless telephone assembly 150, the handset portion 151 of which includes approximately 8 extra function buttons 156. The multimedia display processor 115 is built into the base station 152 of the cordless telephone assembly 150 (which becomes a "set top box" 155) and is connected to the television set 153 by a SCART or composite video connector 154. The display processor 115 controlled by the buttons 156 on the handset portion 151 via the RF connection 157 to the base station 158. (The number and designation of the buttons can be the same as on a standard infra red remote control with a standard net top box.) In this implementation there need be no infra red connection. The display is still presented on the television set 153 and the card can still dial numbers embedded in the data broadcast feed. The handset can also be used to dial out as a normal cordless telephone—ie. either the handset 15 or the processor 115 can set up calls.

In an alternative implementation the display processor 115 is located in its own set top box 155 connected to the television met 153 by a SCART or composite video connector 154. It is controlled by a standard infra red remote control unit leg. The infra red remote control unit 159 also contains the handset portion 151 of the cordless telephone 150.

In the example of FIG. 6, the major data processing functions of the display processor 115 are divided into two parts—database retrieval and stream data monitoring.

Database data is recorded automatically to memory under the control of the CPU and subsequently fetched if requested by the user. Dependent upon the nature of the service, the database data may be stored in memory for a period of minutes, hours or (rarely) days before being replaced automatically by updates—i.e. the user is not able to control the replacement of database data by updates. Nor is the user able to input any data (other than commands)—there is no keyboard or disk drive.

The only situation in which database data is retained after replacement in if the data in question is in display memory at the time the update arrives. Database data may include bitmaps but does not consist of pre-formatted Word-type documents. Examples of database data are TV guides and newspapers. Data that will be formatted (by executable data) into the initial menus (which form the basis of the user interface) is also be held in memory.

Stream data is not recorded to memory unless a specific request hen been entered by the user through a monitoring application. Only that portion of the total stream containing the most recent data that complies with al, the request details entered by the user is stored—i.e. historical stream data in not stored. Once recorded to memory the stream data is stored in memory until erased by the user (i.e. on exit), overwritten (due to limited storage spaced or superseded by more current data captured in response to the name user request—i.e. a recurrent monitoring programme. Examples of stream data services are TAB, stock market, classified advertising and services directories. The menus for these are generated by database data associated with executable data.

Data broadcast data and multimedia TV data may substantially intersect. The multimedia TV data may in some instances be a subset of the data broadcast data. The stream data, some of the executable data and some of the database data of the multimedia TV data may be common with the data broadcast services. Subscriber control is the same. The one VBI can carry both services. All previous assumptions regarding the format and structure of the data broadcast signal will apply to multimedia TV data—i.e. Packet 31 transport layer and POST protocol abject packaging (refer later description). Data broadcasting is however generally intended and destined for Personal Computers rather than television receivers.

When the multimedia display processor 15 is housed in a set-top box 155, it will connect to the television set 153 by a SCART connector.

However, the set-top box 155 will have its own power supply and infra red remote control 16.

Figure 7:
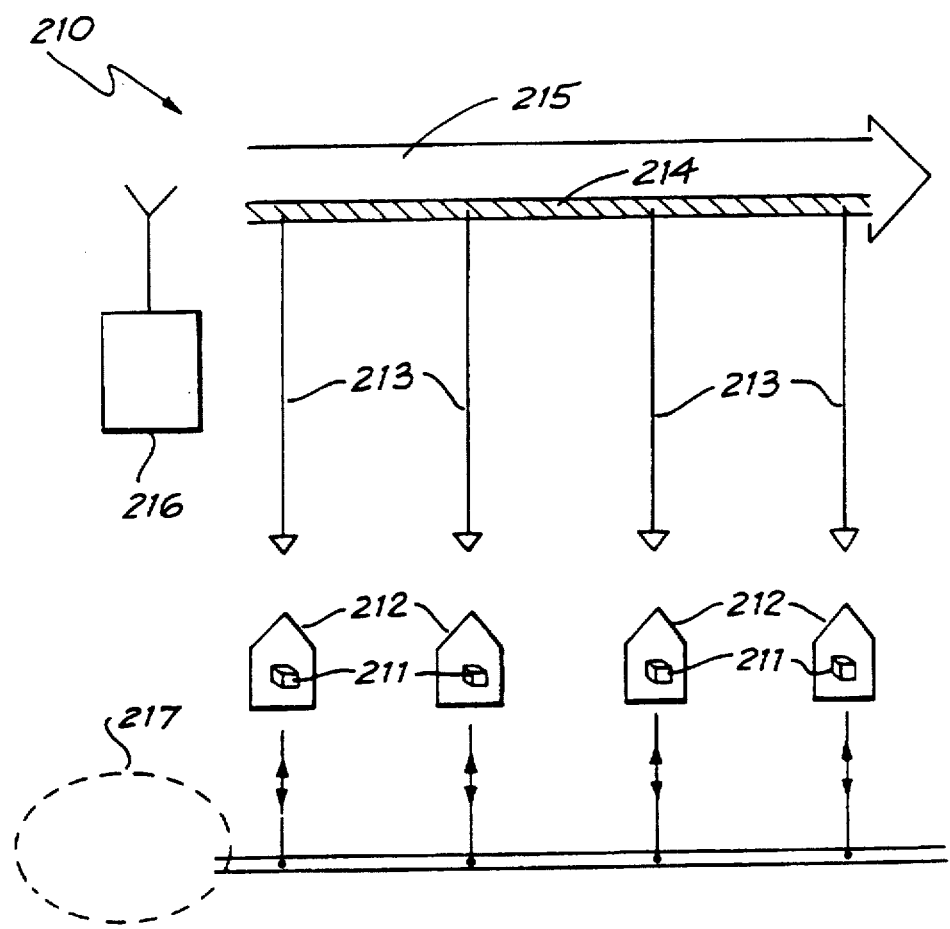

FIG. 7 is a concept diagram for a distributed database system 210 incorporating a plurality of database receivers 211 adapted to receive data from more than one source.

In the arrangement of FIG. 7 there is illustrated one receiver 211 per household 212 although a household could operate more than one receiver 211 if so desired.

The fundamental building block of the system comprises each receiver 211 whose intelligent data processing characteristics allow the flexibility and usability in the broad context of multimedia systems not previously available.

Each receiver 213 is adapted to receive and process a data stream embedded within a carrier signal. The primary example given in this specification the data stream 233 in embedded in the vertical blanking interval portion 214 of television broadcast signal 215.

The organization of the data stream 213 is important if maximum usability of the system is to be achieved. The organization of the data stream 213 must lend itself to rapid interpretation by receivers 211 whilst making the best use of the bandwidth available to it. Utilization of the vertical blanking internal portion 214 of a TV broadcast signal 215 is but one example of a datacasting method, all of which tend to be categorized by a relatively narrow bandwidth compared to the total bandwidth of the signal in which the data stream 213 is embedded.

TV station 216 can contain the database and data inserter from which data stream 213 originates and TV broadcast signal 215 can be delivered by any one of a number of known methods including VHF/UHF transmission, microwave transmission, satellite transmission, fibre optic transmission.

The distributed database system 210 described thus far can be utilised in conjunction with a television set in communication with each receiver 211 whereby data from data stream 213, broadly categorised as either displayable data or executable data is processed by receiver 211 whereby at least portions of the displayable data can be displayed as database visual information on the television set screen in accordance with processing and commands forming part of the executeable data as interpretted and executed by receiver 211.

Functionally can be added to the above described system by included access for each receiver 211 to the public switched telephone network or similar service. The public switched telephone network 217 adds bidirectionality to the distributed database system 210 and also adds a further source of data or at least provides a mechanism for access to a further source or sources of data.

In the particular case of the public switched telephone network 217 this network typically includes as an inherent feature an accounting and debiting mechanism for data which passes through the network.

Data accessed via the public switched telephone network (PSTN) 217 can be delivered to each receiver 211 by means such as electrical conductor, fibre optic cable, satellite delivery, microwave delivery or mobile telephone network delivery.

In many countries today PSTN access to the average household 212 is still narrow band (of the order of 5 kilohertz) however it is expected that the effective bandwidth of these services will be increased progressively as optical fibre networks replace electrical conductor networks and also as data compression technology advances.

In the description of examples to follow, additional detail and methods of implementation of receiver 211, the packet structure for data stream 213 and a complete distributed database system 210 derived from these fundamental building blocks will be described.

Figure 8:
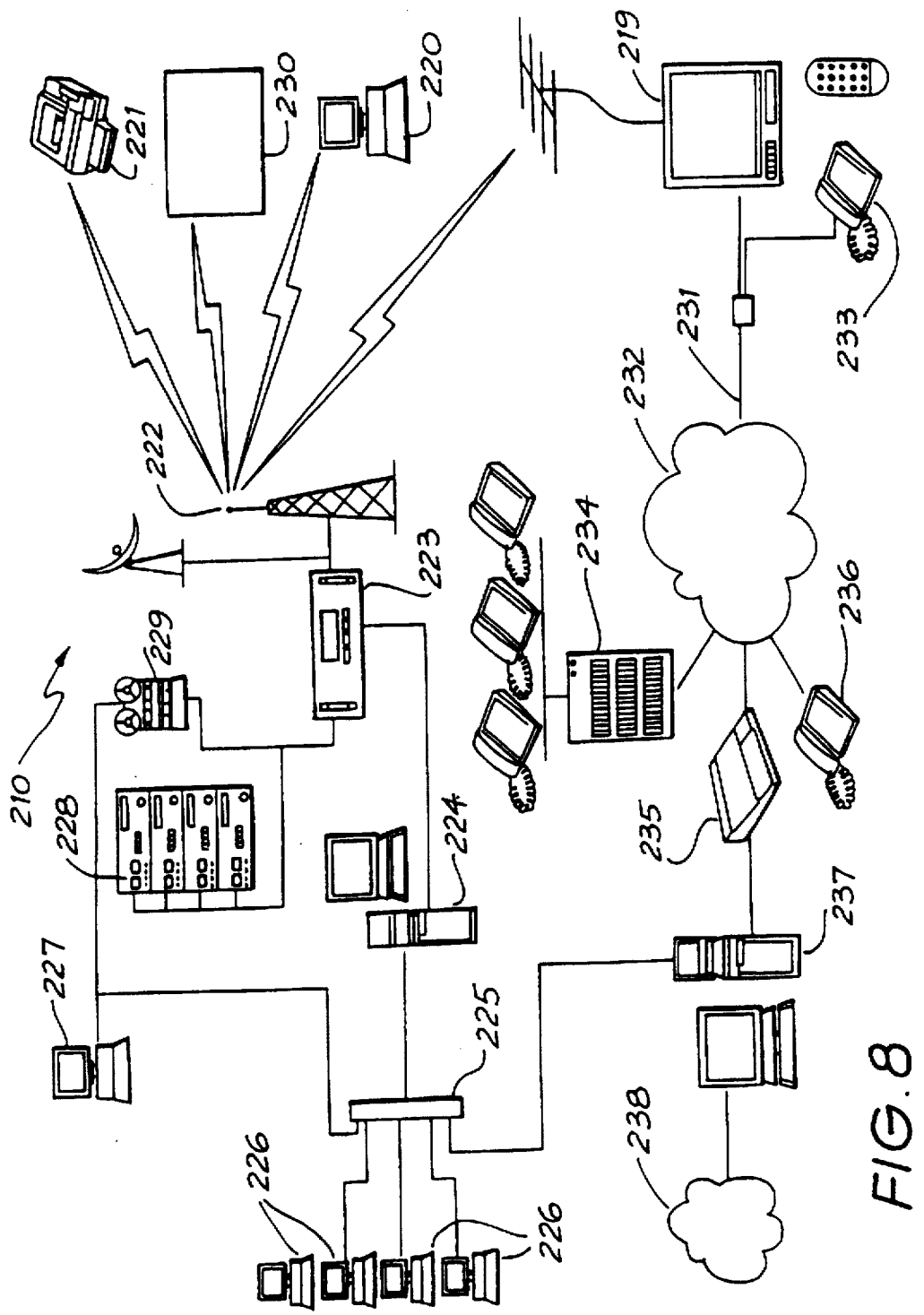

FIG. 8 illustrated a further example of the distributed database system of FIG. 1 which serves to illustrate the diversity of data which can be accessed by a user of a receiver 211 when multiple data sources are made available in the manner generally illustrated and described in respect of FIG. 7.

Conceptually the receiver 211 can be thought of as a data sorter and selective switch making available to an end user in an easily and often quickly accessible form despite the relatively narrow bandwidth of at least some of the channels over which the data must pass.

In this example receivers 211 can be linked to a television set 219, a remote personal computer 220 or a remote printer 221. All of these devices can receive data from the Vertical Blanking Interval of a television signal broadcast via satellite or aerial 222. Data is inserted into the Vertical Blanking Interval (for example utilizing the packet 31 transport layer with POST protocol as later described in this specification) by high speed data inserter 223. The inserter can he, for example, a type DBL 95 which provider an aggregate data rate of greater than 38,400 bits per second.

The data inserter 223 receives data from a database located on file server computer 224. The file server computer 224, in turn, can receive data from ether sources via terminal server 225 receiving information from third party information suppliers 226.

Ordinary television programme material is also schedule via TV station scheduling computer 227, and sourced with replay machine 228 and video programme source 229.

The data thus provided to television receiver 219, PC 220, printer 221 and/or display board 230 is clearly unidirectional in nature.

In addition a bidirectional signal path 231 is provided via PSTN 232. A user of a receiver 211 in conjunction with television met 219 and telephone handset 233 can access or be put in contact with information sources operating through PABX 234, message bank 235, individual telephone system subscriber 236.

The bidirectional signal path 231 provides a three tiered capacity. Firstly, it permits of an outgoing message into the PSTN which may or may not elicit a response. Secondly, it permits a request for information from any information source connected to the PSTN. Information available may be of any type, e.g. pre-recorded audio information, video information via an ADSL system. Thirdly, the signal path permits the setting up of a voice call A return link processor 237 orchestrates receipt supply and confirmation thereof of information accessed via the PSTN 232. The return link processor 237 may communicate with the file server computer 224 via terminal server 225 and can also communicate with financial services computers often connected on their own network 238.

It will be appreciated that the information services made available to devices such as remote printer 221 remote display board 230 and remote PC 220 are in the range of databroadcast as previously described whereas the information resources made available via receiver 211 to television 219 are of the broader nature previously described with particular reference to FIG. 6.

In order to give full effect to the capabilities of receivers ouch an receiver 13 described with reference to FIG. 1 and receiver 113 as described with reference to FIGS. 4 and 6 and receiver 211 described with reference to FIG. 7 and 8 an appropriate data structure should be implemented within the packet 31 transport layer (or ether databroadcast transport layer). A particularly suitable "object oriented" packet structure will now be described.

FIGS. 9A to 9G illustrate a specification for an object oriented packet structure for use for the transport of data of any of the examples of the invention as described above.

Data is transmitted in the form of packets—that is, as a series of individual messages, each consisting of a number of bytes in a specified format. This format is defined by the protocol being used. This section describes the Protocol for Object and Stream Based Transport, hereafter termed POST; which is designed specifically for databroadcast applications.

POST packets may be transmitted directly over the broadcast medium, or they may be contained within packets conforming to another protocol. This "layering" of protocols allows POST to take advantage of the facilities provided by another protocol that may have been tailored for a particular medium or environment.

Since television transmission, and hence databroadcast, in unidirectional, receivers cannot acknowledge the successful reception of data. Consequently, a single transmission is usually repeated an arbitrary number of times to reduce the chance of data loss—the probability of a packet being corrupted in every retransmission rapidly diminishes as repetitions increase. As excessive repetition needlessly wastes bandwidth, field tests are conducted to determine the optimum number of repeats in a given installation. Alternatively, some form of error correction (where corrupted packets are "repaired" at the receiver) may be employed.

The Protocol for Object and Stream Based Transport (POST) is designed to insulate the application developer from the details of the databroadcast medium, and to facilitate the rapid development of databroadcast applications.

Numerous data services can be broadcast simultaneously with each service identified by a service number. The service number is an important part of the control information associated with most POST packets. A receiver's ability to receive a particular service can be regulated as part of a subscription scheme administered by the databroadcast operator.

POST is based on the assumption that data can be represented in one of two ways: as a continuous stream'or as discrete objects. For example, a news article can be considered an object, while "live" stock market information can be thought of as a stream. Objects are grouped together in classes defined by the service provider. Object classes could include file, fax, bitmap, soundtrack and program.

To support this model, POST defines two types of message that say appear in a packet: the Stream message and the Object message.

In addition to the Stream and Object message types, a Command type is provided for high-level control purposes. It is very similar to the stream type, but provides a command facility independent of actual service data. The definition and implementation of commands is left to the service provider.

Finally, a Subscription Control message type is provided to allow the databroadcast operator to regulate receivers' access to the services available on the system. Note that this mechanism is completely independent of the Command message type.

Each POST packet includes a header that contains various control fields indicating its format and identifying its contents. For example, every POST packet includes a Message Type field and a Length field. Some of the information found in the header is not required in every packet or in every installation. For example, if POST packets are carried by an underlying protocol that provides error detection itself, the error detection facilities of POST are not required. As bandwidth is at a premium, unnecessary information and unused portions are eliminated from individual packets whenever possible, while facilities are provided for the inclusion of various additional information where it is required.

To achieve this, POST makes use of variable headers. Every header contains essential information, plus a small indicator field indicating the presence or absence of additional, optional information. If not required, this optional information is not included, and only the small overhead of the indicator field is incurred.

Figure 9A:

With reference to FIG. 9A a POST packet generally consists of a packet header and a data field or message, and is delimited by start and end fields for synchronization. The packet type and format, and other control information such as the service to which the packer belongs, are specified in the packet header. A post packet can also contain an error check field if the lower level protocol does not provide one. This error check, referred to here as the CRC but by no means restricted to that specific method, can be omitted if not required.

A Subscription Control packet is a special case, described separately below.

The packet header specifies the packet type and format, and the service to which the packet is bound. A number of optional fields are also provided. Space is reserved to add additional fields and format flags.

Figure 9B:

The packet header has the format shown in FIG. 9B (except in the case of a Subscription Control message).

The field definitions are as follows:

(i) Message Type

The Message Type field specific the type of message contained in the packet.

(ii) CRC Type

The CRC Type field indicates the presence of a checkout at the end of the packet, and can also identify the error detection/correction scheme used.

(iii) Compression

The compression field indicates the compression scheme, if any, applied to the message field of the packet.

(iv) Length

The Length field specifies the length of the message field.

(v) Reserved Field

This portion of the packet header is reserves to allow future expansion.

(vi) Optional Field Flags

These flags indicate the presence or absence of the various Notional header fields described later.

(vii) Service

The service field specifies the service to which the packet is bound. It can incorporate a service type indicator (e.g. local/national). Extended service identification is supported by an optional header field.

(viii) Extended Service

The first optional header field is used to allow for the expansion of the service field.

(ix) Channel

The optional Channel field allows a Service to be subdivided for the simultaneous transmission of multiple objects or streams.

(x) Address

The optional Address field allows a packet to be directed to a specific receiver.

(xi) Sequence

If the underlying carrier protocol does not support sequencing (or in not present), this optional field can be used to sequence packets. This is most useful in stream transmissions, an objects have a separate sequencing mechanism built in.

Figure 9C:

With reference to FIG. 9C Stream and Command messages simply contain the raw stream or command data, to be processed an required by the service provider. All control information relating to the transmission of the stream (most importantly sequencing information) is contained in the packet header.

The data in the message may be compressed, as indicated by the Compression field in the packet header. Note that as any sequencing and other control information occurs in the packet header, a receiver can decide whether to discard a packet before decompression is required.

Figure 9D:
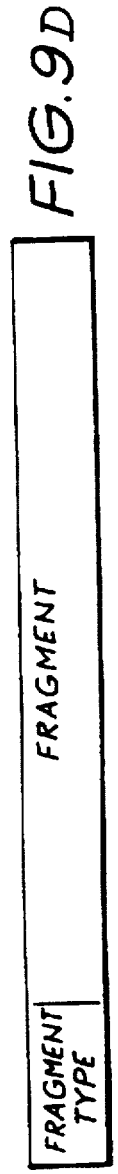

With reference to FIG. 9D which illustrates an object message, an object is broadcast by being broken up and transmitted as a number of fragments. Accompanying each fragment is a number called the fragment offset. The fragment offset specifies the position of the fragment within the object.

The advantage of fragmentation is that transmission errors can be confined to just a few fragments—decoders can combine the good fragments from each repeat broadcast to form a complete set.

The optional Channel field in the packet header can he used to allow several objects to be transmitted simultaneously an the same service, by assigning each to a separate channel.

An Object Message is used to broadcast fragment of an object. The message consists of a type field followed by the object fragment. There are three fragment types—Beginning of Object (BOO), Continuation of Object (COO), and End of Object (EOO). Essentially, one BOO fragment initiates the transmission of the object, several COO fragments transfer the object data, and one EOO fragment ends the transmission. The EOO fragment may be smaller than the COO fragments.

Figure 9E:

With reference to FIG. 9E, the BOO fragment contains information about the object and the transfer itself The field definitions of a BOO message are as follow:

(i) Group

The Group field identifies a group to which this object is directed. The group can consist of one or more receivers. The grouping scheme is independent of the POST protocol.

(ii) Class

The Class field contains a numeric value that specifies the object's class. The value in defined by the service provider.

(iii) Object Identifier

The Object ID field contains number that uniquely identifies the object. The value is defined by the service provider.

(iv) Object Size

The Object Size field specifies the size of the complete object.

(v) Fragment Offset Length

The Fragment Offset Length specifies the length of the Fragment Offset field of subsequent COO and EOO fragments (vi) Fragment Length The Fragment Length field specifies the size of the object fragments in subsequent COO fragments.

(vii) Object CRC

The Object CRC field contains a cyclic redundancy check (CRC) of the complete object. It is used after the EOO fragment is received to confirm that the object has been correctly received and assembled.

Figure 9F:

With reference to FIG. 9F the object broadcast continues with "Continuation of Object" (COO) fragments The last fragment is transmitted as an "End of Object" (EOO) fragment. These two fragment types are identical in format.

The field definitions are as follows:

(i) Fragment Offset

The Fragment Offset field specifies the position of the fragment within the object. Fragment Offsets start or zero and increase by one for each fragment.

(ii) Fragment Data

The Fragment Data field contains the actual object fragment.

As subscription control is a fundamental issue in subscriber databroadcast services, a special message type has been dedicated to this facility. The format of the Subscription Control message is quite different from the other message types—the packet header is significantly stripped down.

Figure 9G:
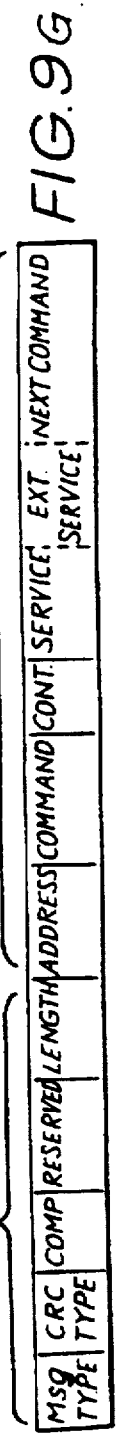

FIG. 9G shows both the packet header and message structures for a Subscription Control message.

To simplify processing, the packet header is similar to the first part of the normal packet header. Note that a packet CRC and compression are provided for. The packet length field is used, but other packet header fields are not supported. The Message Type field will always indicate a Subscription Control message.

The fields in the message portion of the packet are defined as follow:

(i) Address

The Address field specifies the receiver to which the Subscription Control message is directed. This is the same kind of address that appears in the optional Address field of the standard Packet Header.

(ii) Command

This field contains the actual subscription control command. Typical commands include Subscription Service, Unsubscribe Service, and Unsubscribe All Services.

(iii) Continue

The Continue field indicates that the message contains another command after this one.

(iv) Service

The service field specifies the service to which the command applies.

(v) Extended Service

This optional field in used to specify an extended service number.

(vi) Additional Commands

The Continue field allows multiple commands to the same receiver to be transmitted in a single packet. These commands appear consecutively in the message, with the Continue fields set in all but the final command.

Figure 10:
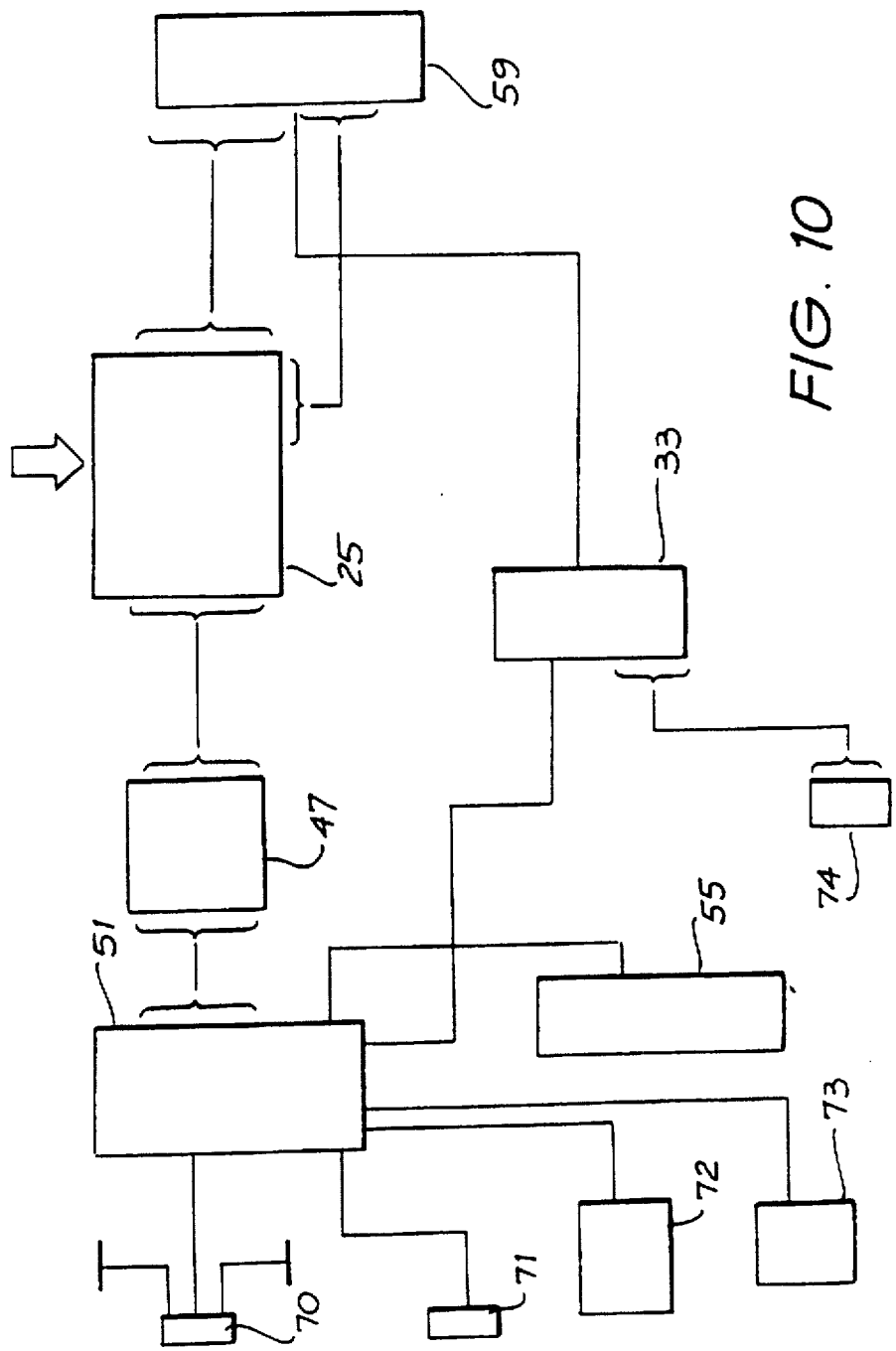

Any one of the display processors referred to in the examples of receivers 13, 113, 211 can be implemented utilizing VLSI logic as illustrated in block form in FIG. 10.

Components in FIG. 10 are numbered according to the first embodiment described with respect with FIGS. 1, 2 and 3.

In this implementation CPU 51 can comprise an Intel 87C51FC embedded controller containing 32 Kbyte of programme memory. Closely coupled to CPU 51 in memory 55 comprising 128 Kbytes of RAM. Additional memory 59 comprising communication or screen memory services a display and acquisition device comprising a Plessey MV1815 IC performing the function of means for communicating 33

Decoder means 25 comprises an Altera EPM 5128 device which decodes the raw packet data, select the appropriate packet 31 channels demultiplexes computer memory addresses for memory 55, selects the appropriate programme or data portion of memory 55 and writes the data out to FIFO 47. The FIFO is a QS 2704 IC utilized to buffer incoming packet 31 data destined for CPU 51.

Input output devices include power port 70 which provide a course of 5 volt power and provides printer output from CPU 51.

I2C port 71 provides infra red remote control access.

A DTMF generator 72 attaches to PSTN interface 73 for dialling, modem signalling and general telephone network access. A SCART video output 74 provides data access to the television set under the control of means for communicating 33.

The above describes only some embodiments of the present invention and modifications obvious to those skilled in the art can be made thereto without departing from the scope and spirit of the present invention.

INDUSTRIAL APPLICABILITY

The database system and the individual receivers as described in various embodiments of the specification are particularly useful for the dissemination of a broad range of information to the home and office. The information can be visual or audible in nature and can be derived from more than one source.

We claim:

1. A distributed database system comprising:

a central station for accumulating and distributing data on a database, a plurality of receiver stations for receiving said data and selectively making available at least portions of said data in accordance with the demands of a user of a said receiver station; and transmission means for encoding and transmitting said sequential data stream, which is delivered embedded within television signals;

wherein said central station comprises: a data store for storing accumulated data from said database, ready for distribution; processing means for extracting said data from said data store and generating a sequential data stream therewith for distribution; and transmission means for encoding and transmitting said sequential data stream; and a said receiver station comprises: decoder means to receive and decode transmitted data so as to reconstitute said database data therefrom; input means for a user of said receiver station to input user commands in respect of the demands of the user to said receiver station; receiver processing means for constituting a database from said data having regard to said user commands; memory means for storing data for constituting said database; and means for communicating selected data in direct response to said user commands.

2. A distributed database system comprising:

a central station for accumulating and distributing data on a database, and a plurality of receiver stations for receiving said data and selectively making available at least portions of said data in accordance with the demands of a user of a said receiver station;

wherein said central station comprises: a data store for storing accumulated data from said database, ready for distribution; processing means for extracting said data from said data store and generating a sequential data stream therewith for distribution; and transmission means for encoding and transmitting said sequential data stream; and a said receiver station comprises: decoder means to receive and decode transmitted data so as to reconstitute said database data therefrom; input means for a user of said receiver station to input user commands in respect of the demands of the user to said receiver station; receiver processing means for constituting a database from said data having regard to said user commands; memory means for storing data for constituting said database; and means for communicating selected data in direct response to said user commands;

wherein said decoder means includes: data acquisition means for extracting a serial data stream and a synchronization signal from the transmitted signal; a data decoder to filter out data control information from said serial data stream and reconstitute said database data; and transfer means to continuously transfer a stream of reconstituted data to said receiver processing means.

3. The system of claim 2 wherein said receiver processing means includes further decoder means to examine said stream of reconstituted data and extract said index data therefrom; and database handling means to determine storage of individual database data in accordance with a prescribed algorithm: whereby in response to a decision to store or update said individual database data, said database handling means is adapted to transfer said individual database data to a requisite storage location in said memory means and perform contingency action according to a prescribed algorithm involving changing the structure of said database so as to continuously constitute said database.

4. The system of claim 3 wherein said memory means comprises a predetermined amount of available space fop storing communicable records of the constituted database, a separate space for storing an index table relating the records, and a communication memory for storing records for said means for communicating.

5. The system of claim 4 wherein said prescribed algorithm requires said database handling means to have regard to available space in said memory means: and in the absence of available space, have regard to said user commands as input with said input means.

6. The system of claim 5 wherein said prescribed contingency action also includes updating said index table with the index data of said individual database data being stored.

7. The system of claim 6 wherein said input means processes said user commands and a set of database search parameters input by a user, parses said constituted database stored within said memory means for communicable records falling within said search parameters, formats the selected records in accordance with a prescribed communication format, and passes said records to said communication memory.

8. The system of claim 7 wherein said means for communicating accesses said communication memory and includes a character generating means to generate characters for display purposes in respect of the communicable records stored in said display memory.

9. The system of claim 8 wherein said input means continuously parses said constituted database for additional communicable records falling within said search parameters and passes said additional records to said communication memory for communication purposes in response to receiving an appropriate user command input by the user.

10. The system of claim 9 wherein said prescribed communication format is separately definable by the discrete transmission of attribute data from said central station.

11. The system of claim 10 wherein said decoder means, receiver processing means, input means and means for communicating operate concurrently with each other.

12. A database receiver for a distributed database system of the type defined in claim 1, said receiver comprising:

decoder means to receive and decode data transmitted to the database receiver to reconstitute database data therefrom;

input means fop receiving and processing user commands input by a user of said database receiver in respect of the demands of the user;

receiver processing means for constituting a database from said database data having regard to said user commands;

memory means for storing database data for constituting said database; and means for communicating selected database data from said constituted database in direct response to said user commands.

13. A method for providing a distributed database for access and searching by a user comprising:

accumulating and distributing data for the database to a plurality of users;

receiving and analysing the distributed data in accordance with the demands of the user for selective storage of the data;

searching the stored data in response to a user command having regard to the demands of the user; and communicating selected stored data conforming to the demands of the user, to the user.

14. A method for receiving distributed database data and selectively communicating the same to a user comprising:

receiving via a television signal and decoding distributed data to reconstitute database data therefrom:

receiving and processing user commands representative of the demands of a user;

constituting a database from the database data having regard to the user commands;

storing selected database data for the constituted database; and communicating selected database data from the constituted database in direct response to the user commands to the user.

15. A distributed database system comprising at least a primary database in communication via communication means including a television signal with a plurality of remote receiver stations; each remote receiver station including storage means adapted to store at least a selected portion of said primary database, each said receiver station further including data processing means adapted to process information stored in said storage means.

16. A distributed database system comprising at least a primary database in communication via communication means with a plurality of remote receiver stations; each remote receiver station including storage means adapted to store at least a selected portion of said primary database, each said receiver station further including data processing means adapted to process information stored in said storage means; and further including input means for a user of a said receiver station and wherein said data processing means processes information contained in data sent from said at least primary database and also processes information received from said input means in order to determine which portions of said data and in what manner said portions of said data are to be presented to said user by said receiver station.

17. The system of claim 16 wherein the communication means comprises a selected portion of a TV transmission signal.

18. The system of claim 17 wherein said storage means is sufficient to store substantially the contents of said primary database.

19. The system of claim 17 wherein said storage means is sufficient to store only selected portions substantially the contents of said primary database.

20. The system of claim 17 wherein the data stored in said primary database comprises more than one type of data.

21. The system of claim 17 wherein each said remote receiver station is adapted to receive and process said database data and to selectively receive and process said stream data.

22. The system of claim 16 wherein said communication means includes a first communication link adapted for transmission of data from said primary database to said plurality of remote receiver stations and at least a second communications link adapted for communication of data from said plurality of remote receiver stations to said primary database.

23. The system of claim 22 where in said at least second communication link additionally is adapted for selective communication with a plurality of databases.

24. The system of claim 22 wherein said at least second communication link is bidirectional and comprises one of the public switched telephone network (PSTN), or cellular telephone network, or GSM telephone network.

25. The system of claim 22 wherein said subscriber stations connect to said at least second communication link by means of a microprocessor interface which comprises a modem.

26. The system of claim 25 wherein said first communications link is a high bandwidth link adapted to transmit primary data and secondary data with said primary data taking up a major portion of said bandwidth and said secondary data taking up a minor portion of said bandwidth.

27. The system of claim 26 wherein said at least second communication link has a relatively low bandwidth.

28. The system of claim 26 wherein said forward communications link comprises a TV broadcast signal and said primary data comprises broadcast TV information and said secondary data comprises database data.

29. The system of claim 28 wherein said data for transmission on said at least second communication link comprises a data message which may or may not elicit a response.

30. The system of claim 28 wherein said data for transmission on said at least second communication link comprises a request for information to be downloaded.

31. The system of claim 28 wherein said data for transmission on said at least second communication link initiates a voice call.

32. A remote receiver station for use with the distributed database system of claim 15, said receiver station further including input means for a user and wherein said data processing means processes the information contained in data received from one or more sources of data and also processes information received from said input means in order to determine which portions of said data and in what manner said portions of said data are to be presented to said user by said receiver station.

33. The station of claim 32 wherein said data includes displayable data and executable data.

34. The receiver of claim 33 wherein said data can include executable data adapted for storage in storage means in said receiver for execution by said receiver station.

35. The receiver station of claim 34 wherein said executable data includes a control programme adapted to recognise the nature of said data and to update and/or replace portions of said data resident in said storage means.

36. The receiver station of claim 35 wherein said receiver station receives at least some of said data by means of a packet based object oriented protocol.

37. The receiver station of claim 36 wherein said data is categorised in said protocol as either object data or stream data.

38. The receiver station of claim 37 wherein said objects additionally include command objects and subscription control objects.

* * * * *

UNITED STATES PATENT AND TRADEMARK OFFICE
CERTIFICATE OF CORRECTION

PATENT NO. : 5,737,595
DATED : April 7, 1998
INVENTOR(S) : Thomas A. Cohen et al.

It is certified that error appears in the above-identified patent and that said Letters Patent is hereby corrected as shown below:

Title page,
Item [30], Foreign Application Priority Data, "Nov.24,1992 [AU] Australia ............ PL 6080" should be -- Nov.27,1992 [AU]   Australia ............ PL 6080 --.
Item [86], PCT No.: "PCT/AU93/00604" should be -- PCT/AU93/00607 --.

Signed and Sealed this

Twenty-eighth Day of June, 2005

JON W. DUDAS
*Director of the United States Patent and Trademark Office*